Figure 5:
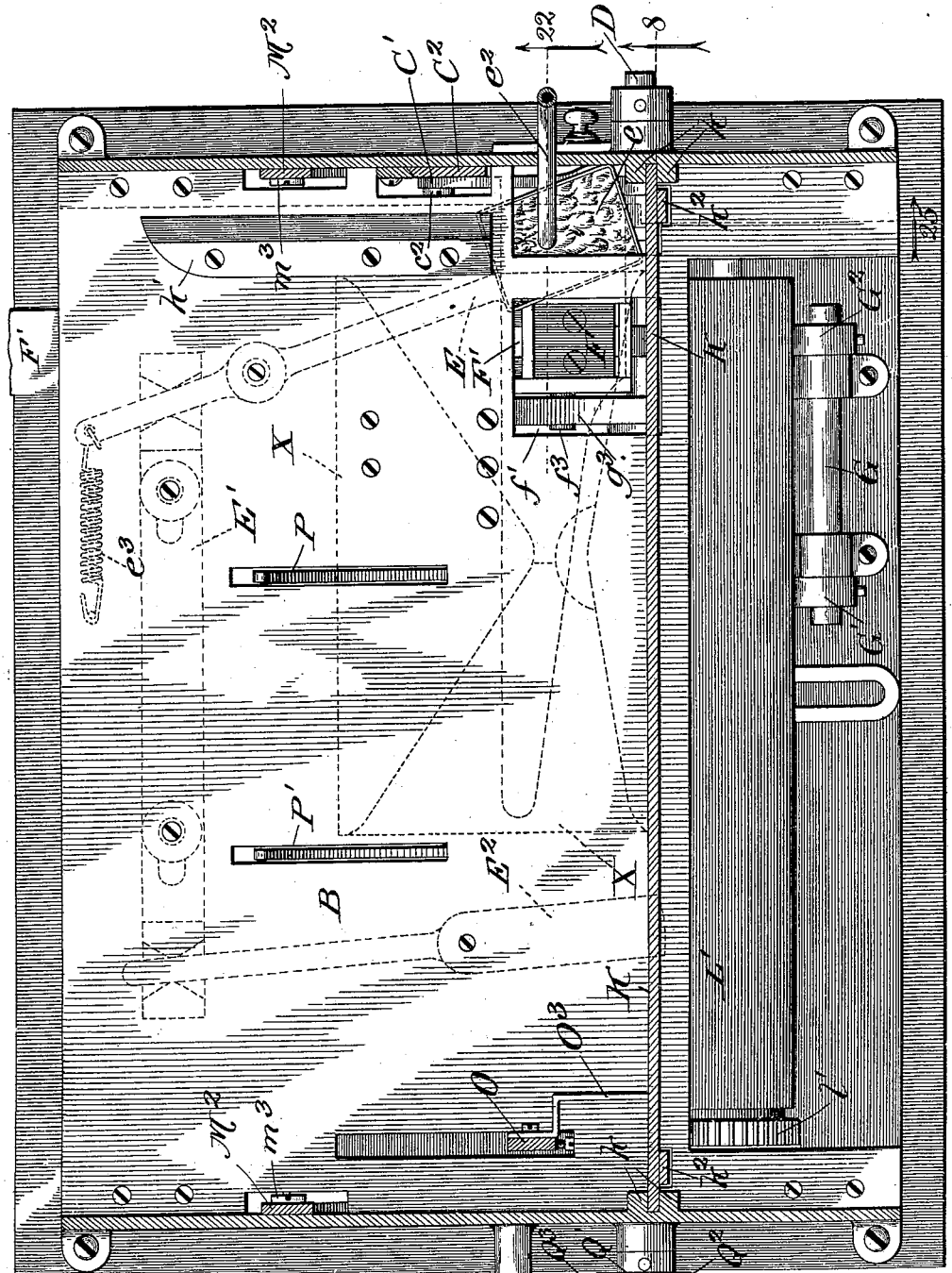

No. 644,075. Patented Feb. 27, 1900.
F. J. HEWITT & C. H. BRIDOUX.
MACHINE FOR STAMPING AND SEALING ENVELOPS.
(Application filed Feb. 4, 1899.)
(No Model.) 13 Sheets—Sheet 1.
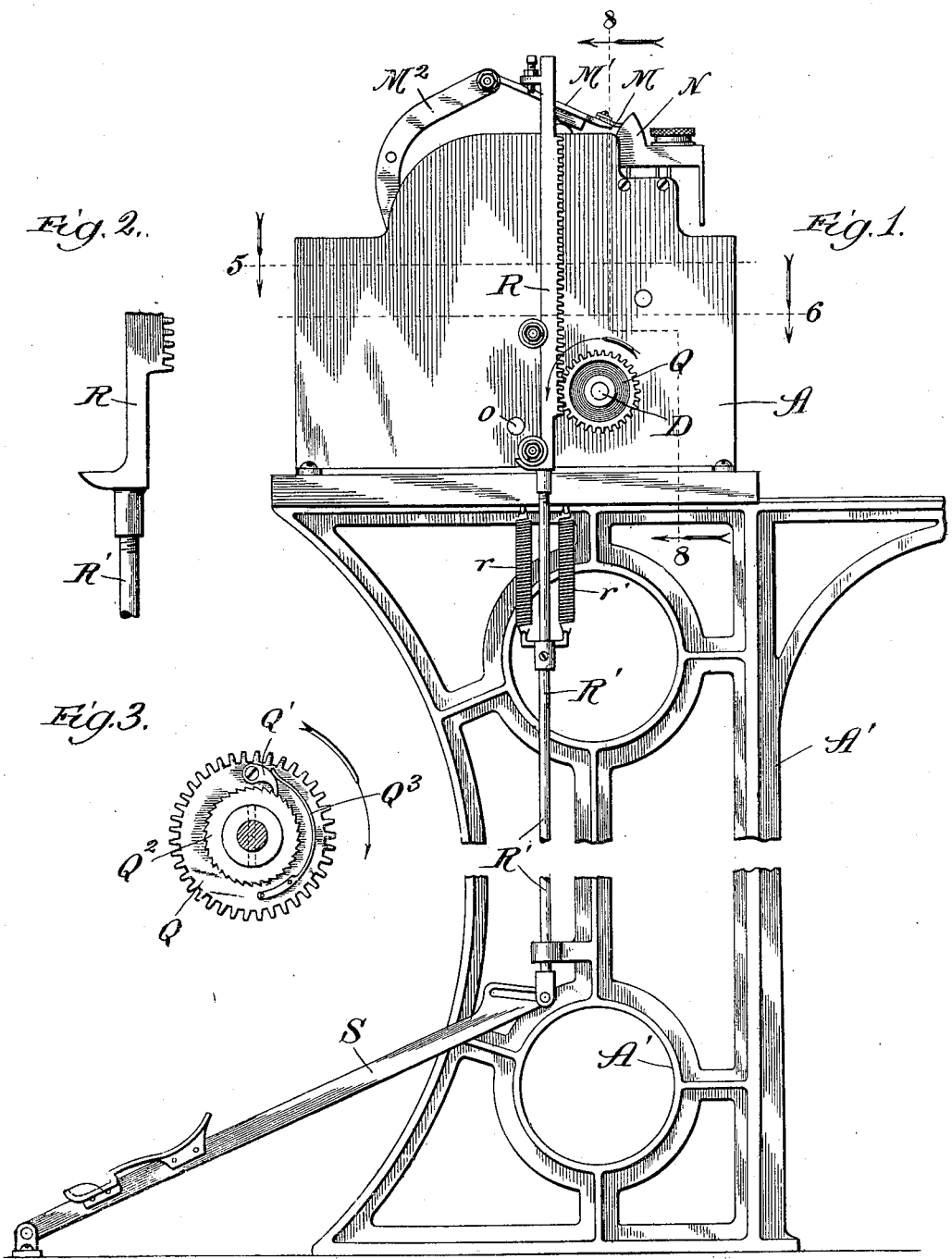

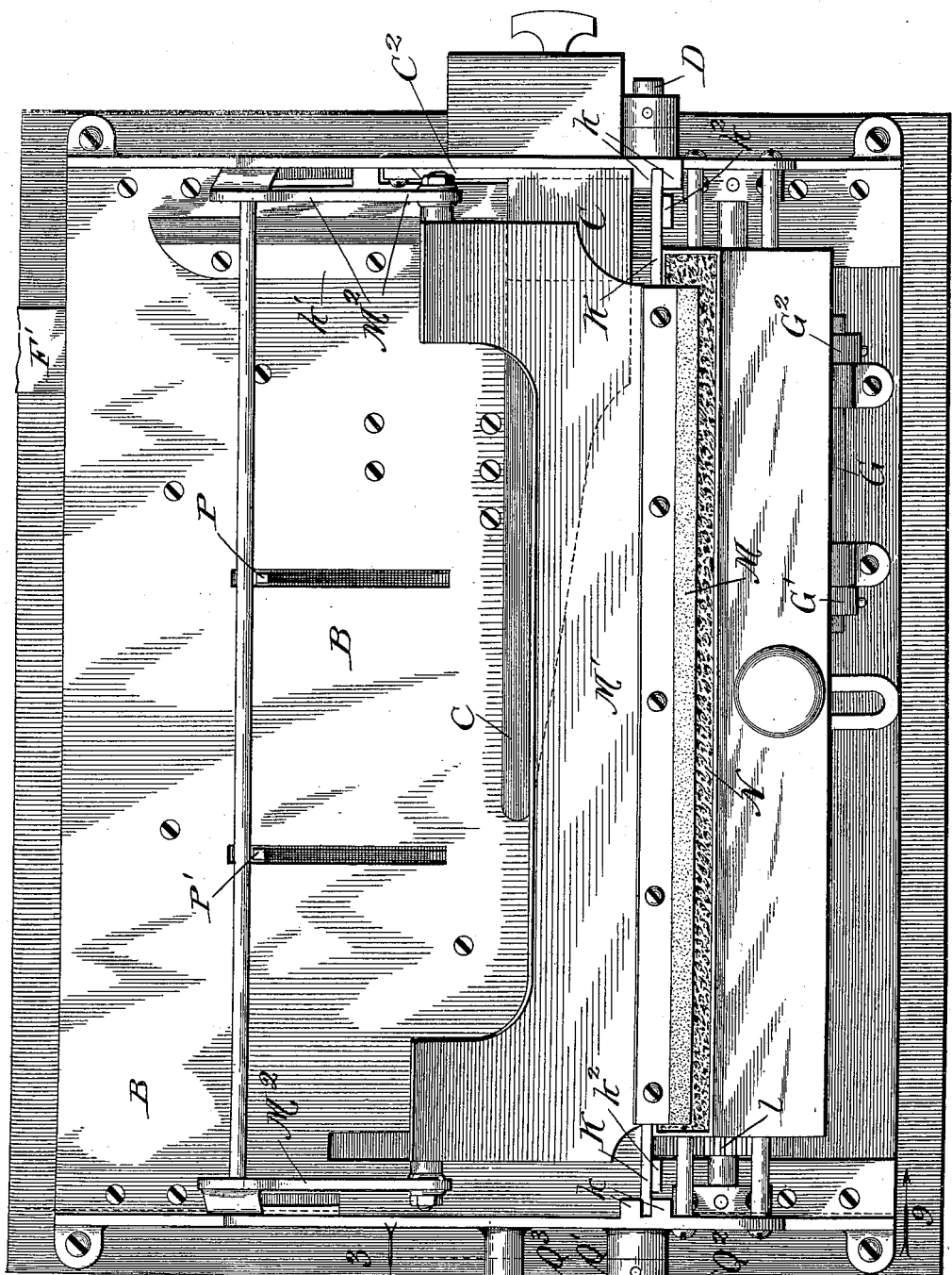

No. 644,075. Patented Feb. 27, 1900.
F. J. HEWITT & C. H. BRIDOUX.
MACHINE FOR STAMPING AND SEALING ENVELOPS.
(Application filed Feb. 4, 1899.)
(No Model.) 13 Sheets—Sheet 3.

No. 644,075. Patented Feb. 27, 1900.
F. J. HEWITT & C. H. BRIDOUX.
MACHINE FOR STAMPING AND SEALING ENVELOPS.
(Application filed Feb. 4, 1899.)
(No Model.) 13 Sheets—Sheet 4.

Witnesses:
Inventors:
Frederick J. Hewitt
Charles H. Bridoux,
By Banning & Banning & Sheridan,
Attys.

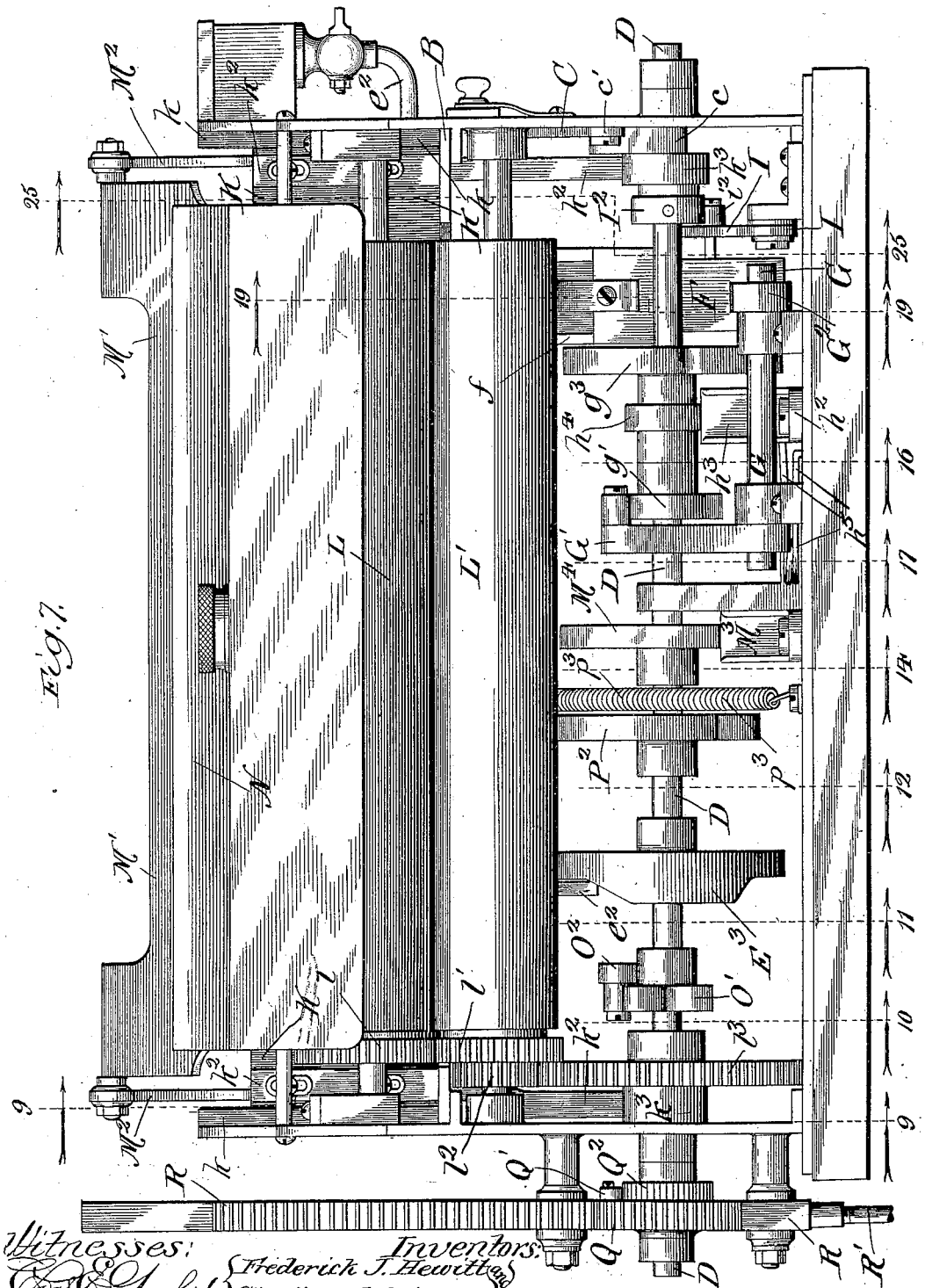

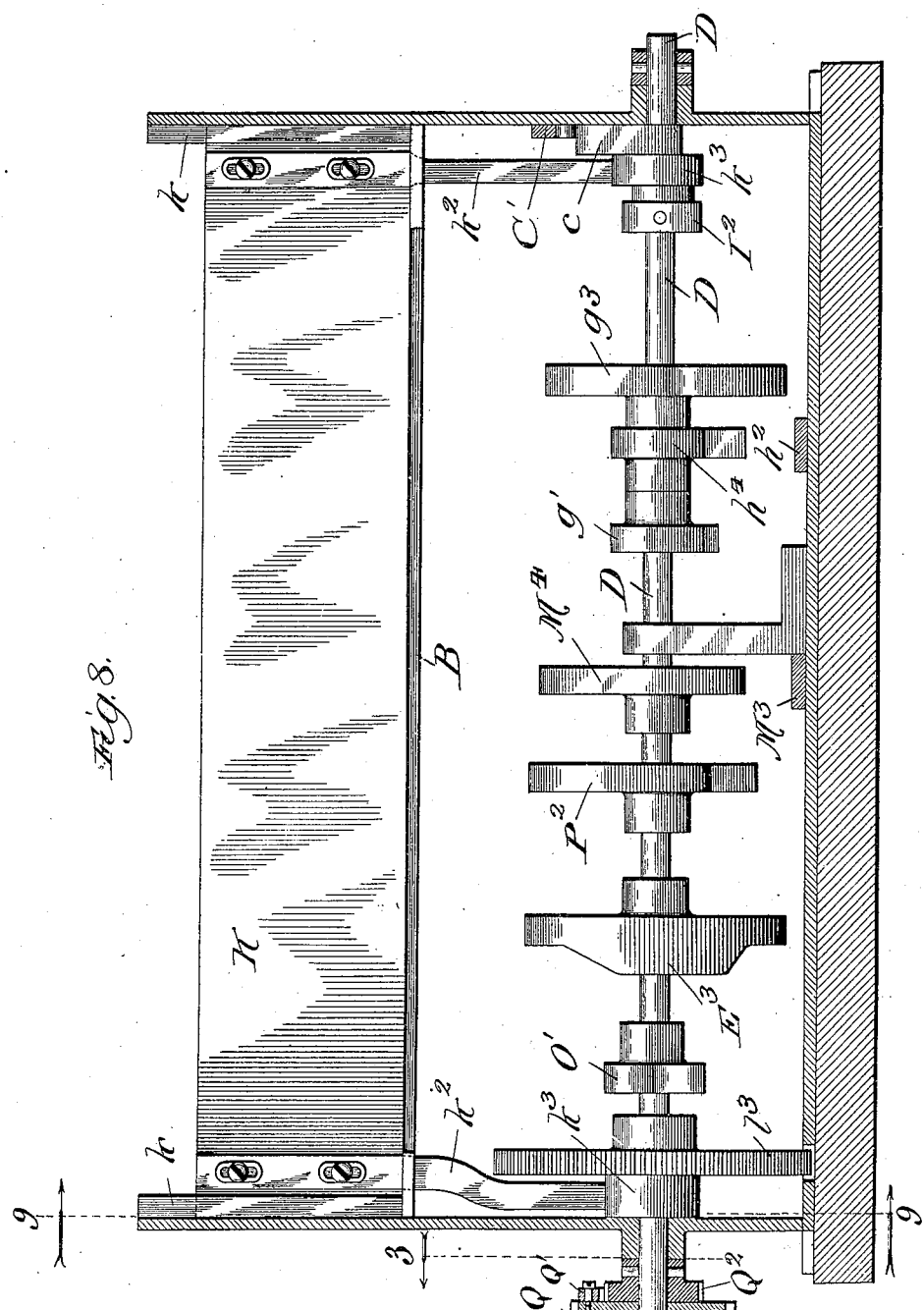

No. 644,075. Patented Feb. 27, 1900.
F. J. HEWITT & C. H. BRIDOUX.
MACHINE FOR STAMPING AND SEALING ENVELOPS.
(Application filed Feb. 4, 1899.)
(No Model.) 13 Sheets—Sheet 7.
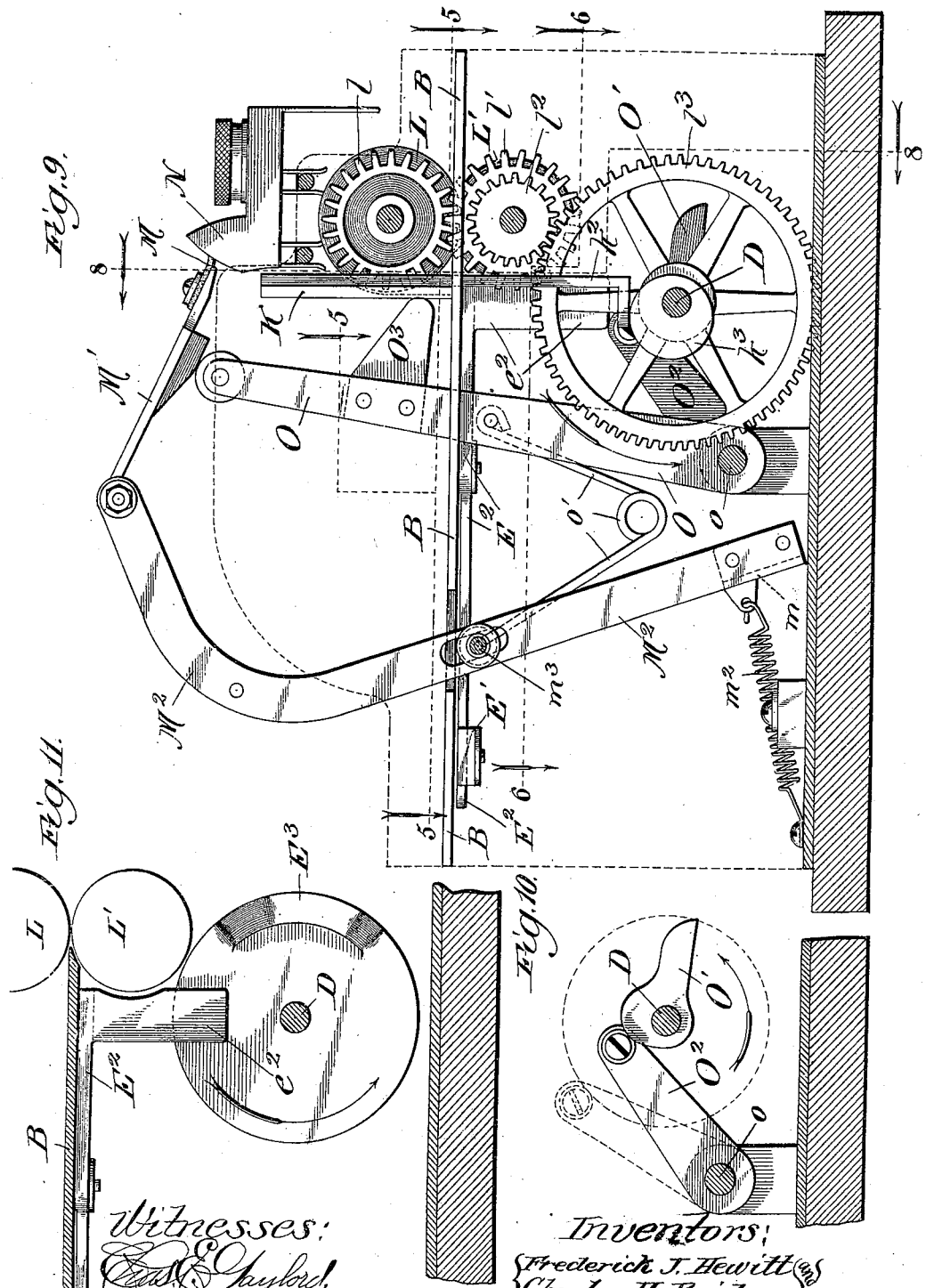

No. 644,075. Patented Feb. 27, 1900.
F. J. HEWITT & C. H. BRIDOUX.
MACHINE FOR STAMPING AND SEALING ENVELOPS.
(Application filed Feb. 4, 1899.)
(No Model.) 13 Sheets—Sheet 8.
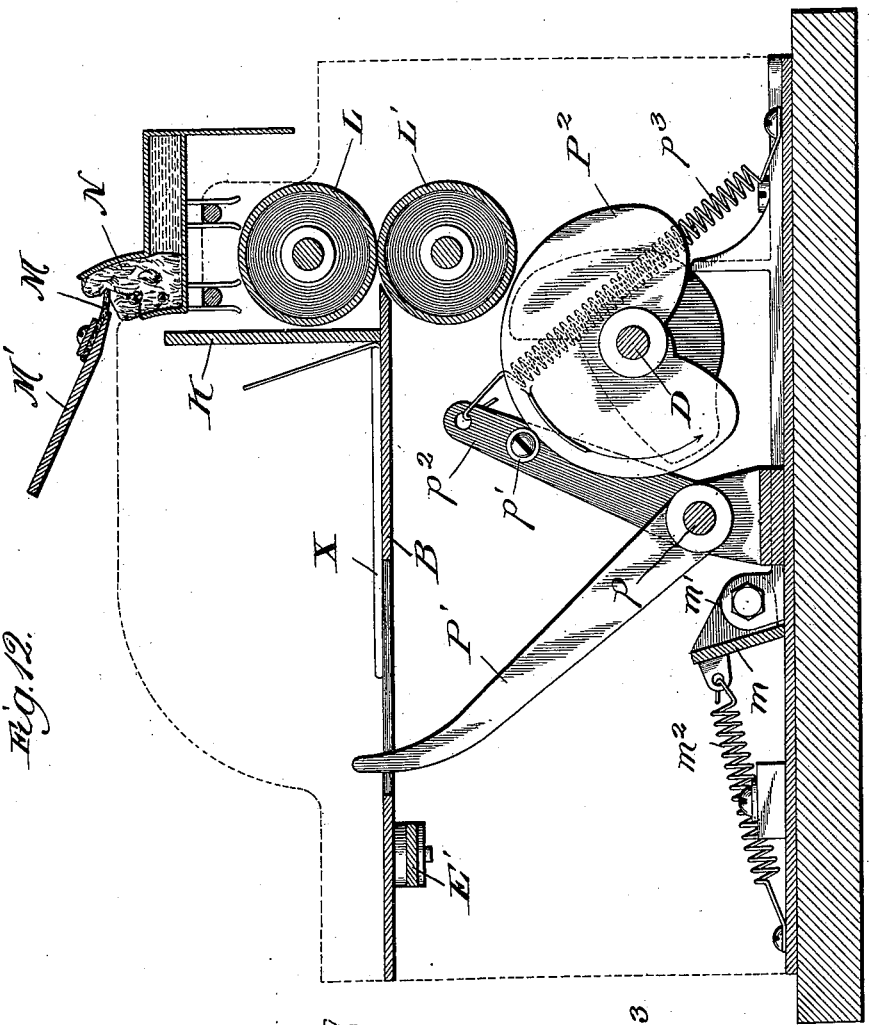
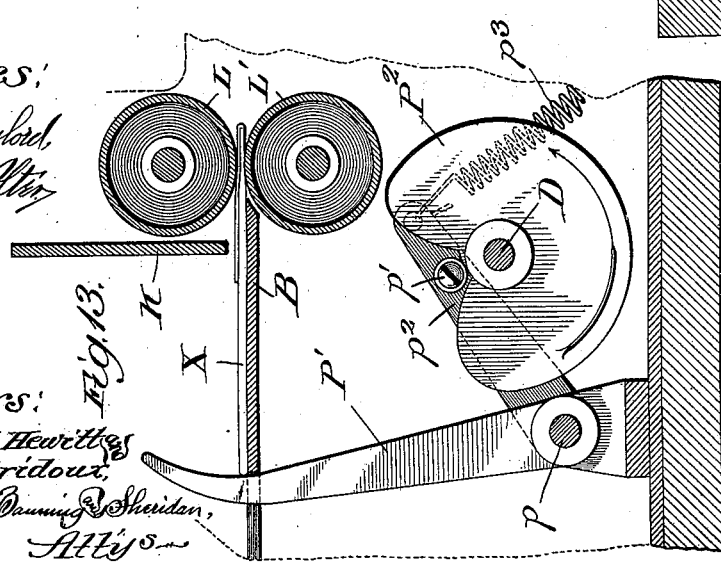

No. 644,075. Patented Feb. 27, 1900.
F. J. HEWITT & C. H. BRIDOUX.
MACHINE FOR STAMPING AND SEALING ENVELOPS.
(Application filed Feb. 4, 1899.)
(No Model.) 13 Sheets—Sheet 9.
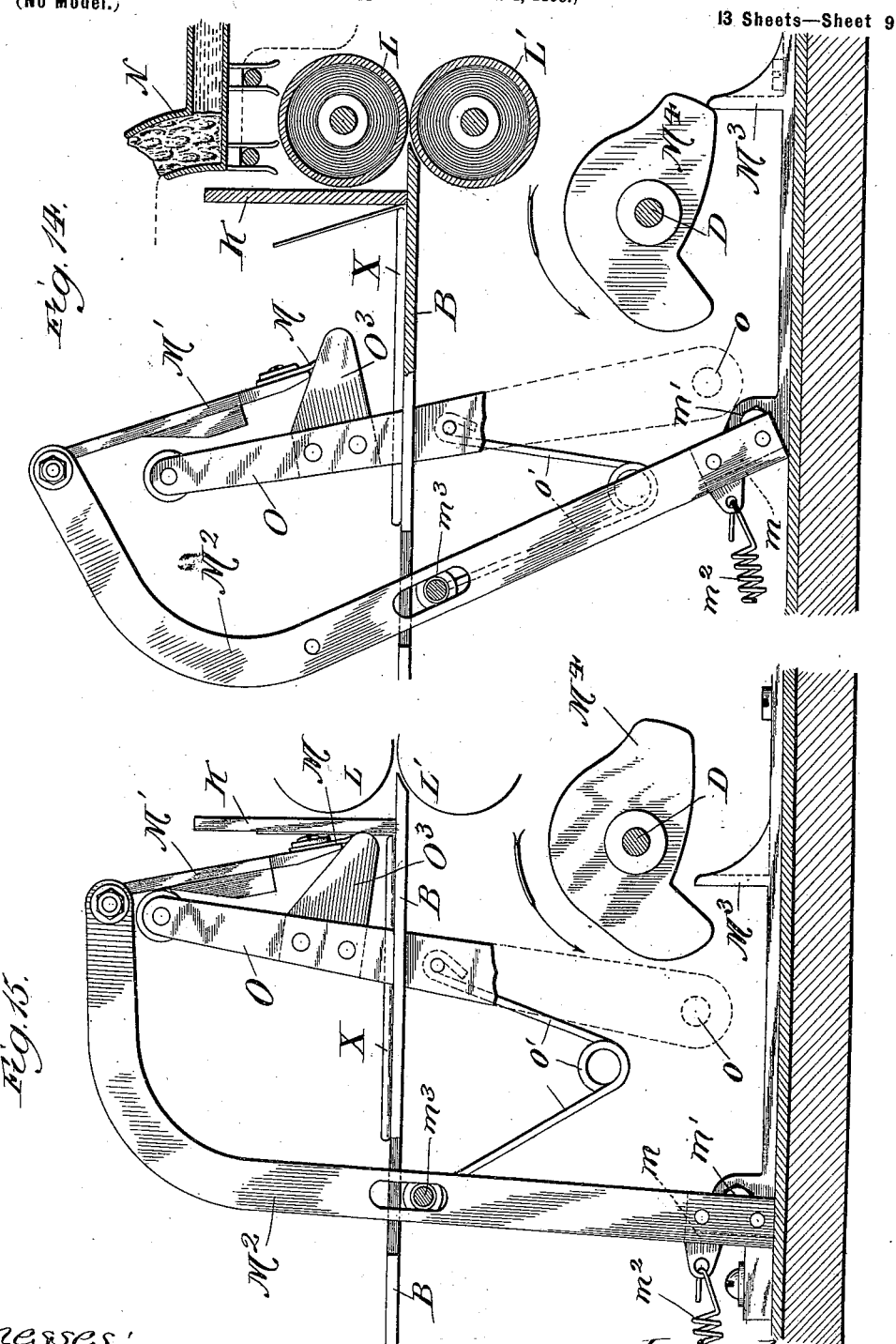

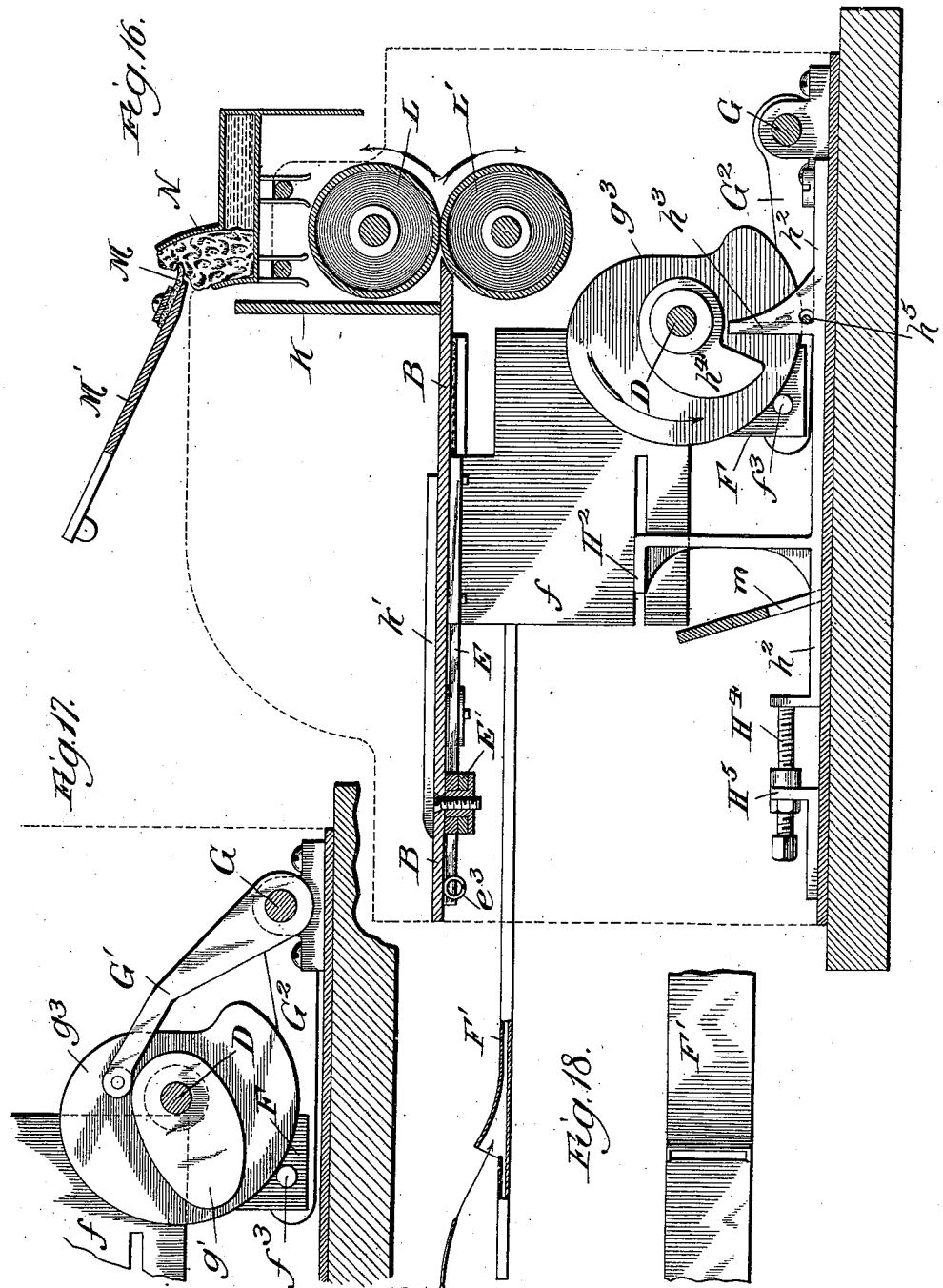

No. 644,075. Patented Feb. 27, 1900.
F. J. HEWITT & C. H. BRIDOUX.
MACHINE FOR STAMPING AND SEALING ENVELOPS.
(Application filed Feb. 4, 1899.)
(No Model.) 13 Sheets—Sheet 11.
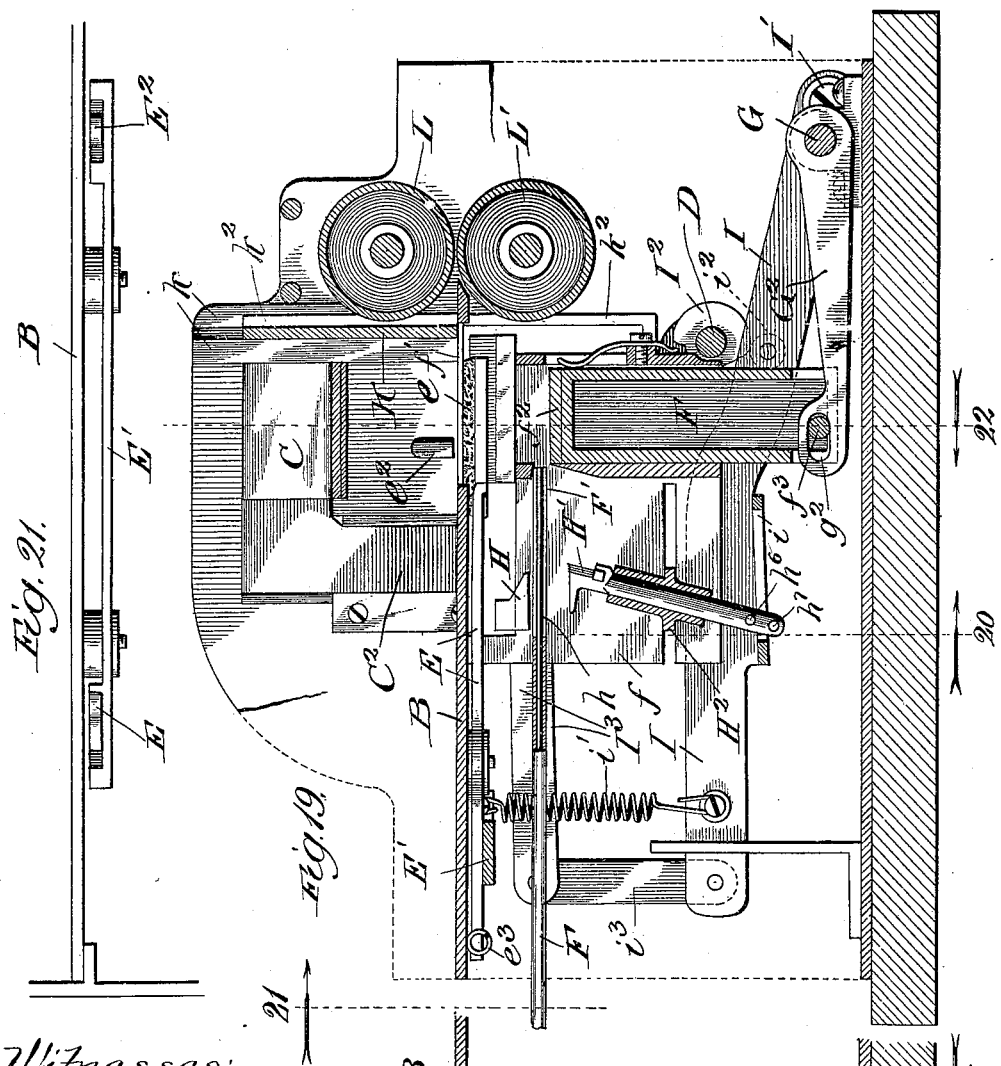

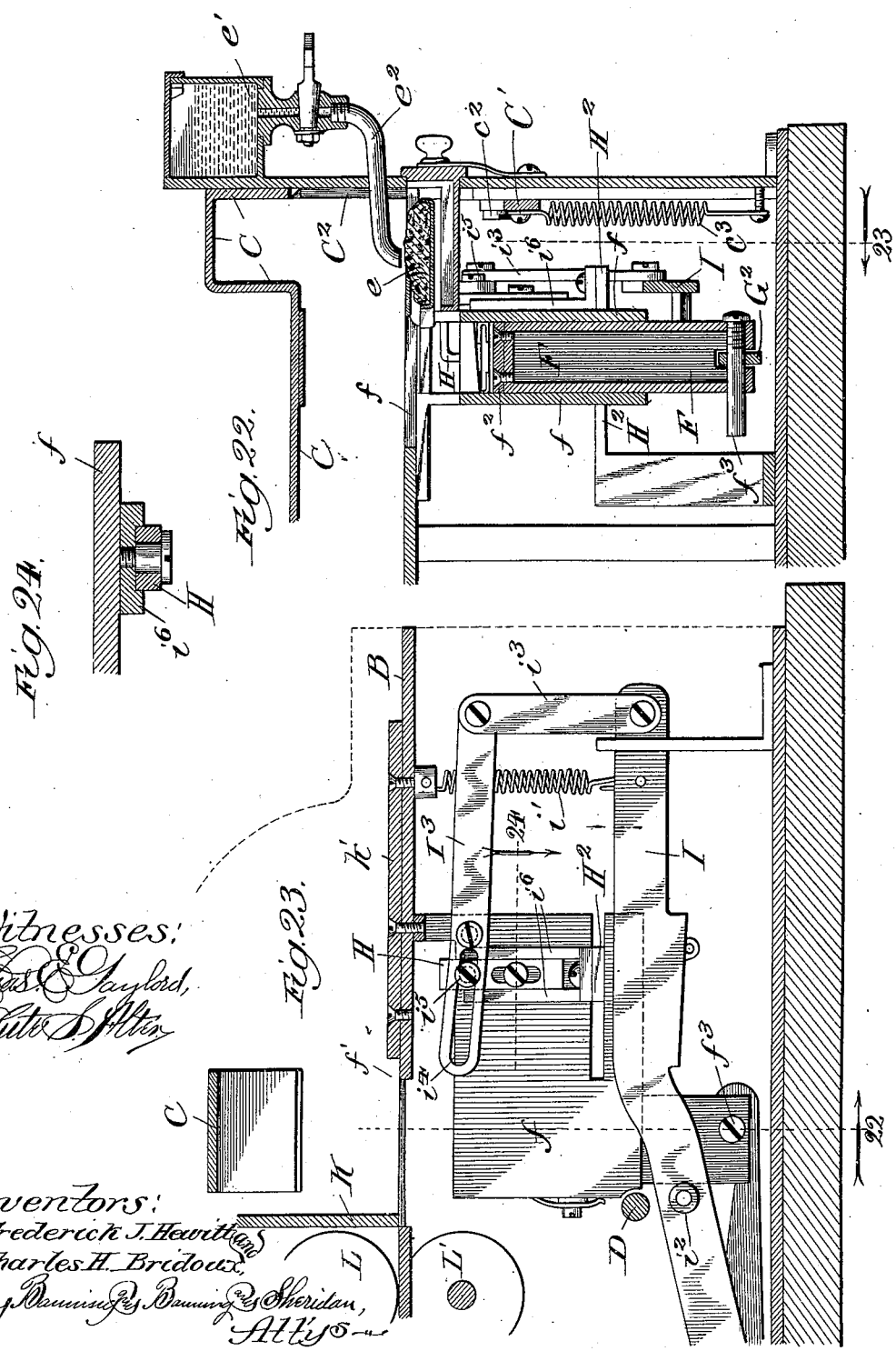

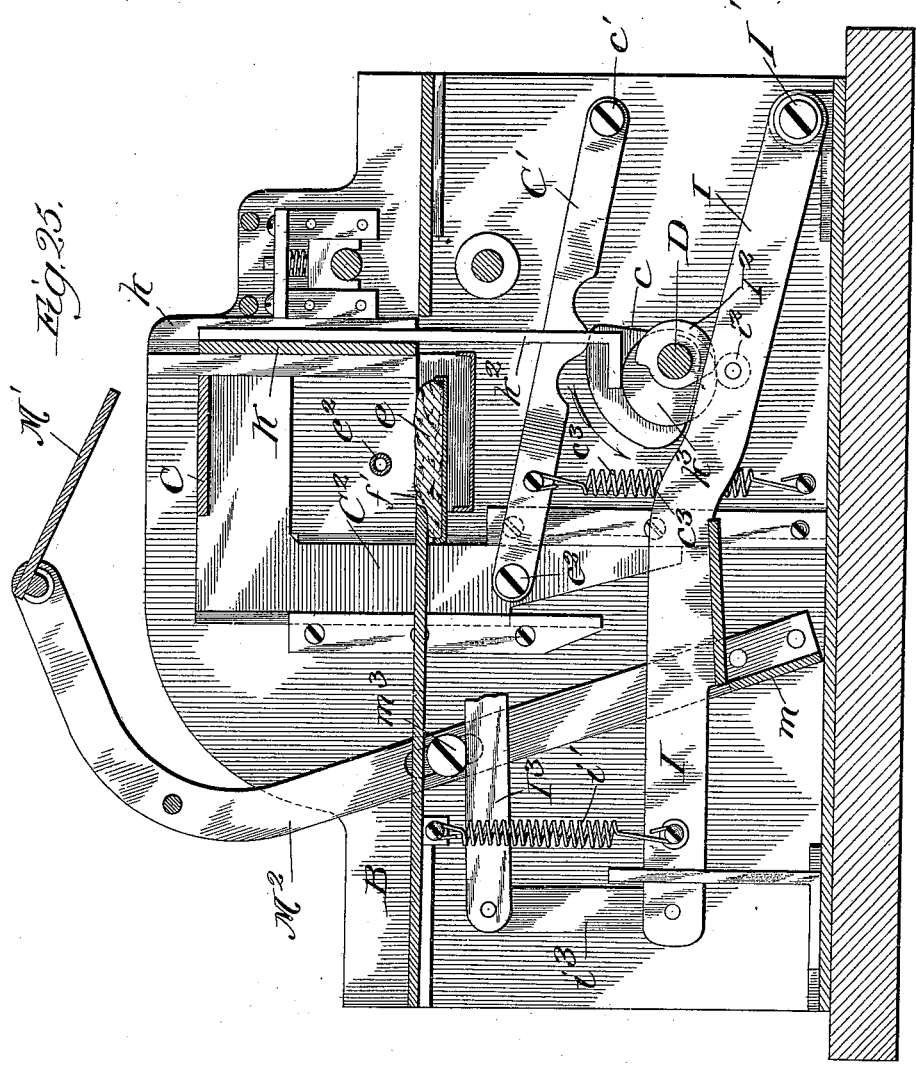

UNITED STATES PATENT OFFICE.

FREDERICK J. HEWITT AND CHARLES H. BRIDOUX, OF CHICAGO, ILLINOIS, ASSIGNORS TO THE HEWITT SEALER AND STAMPER COMPANY, OF SAME PLACE.

MACHINE FOR STAMPING AND SEALING ENVELOPS.

SPECIFICATION forming part of Letters Patent No. 644,075, dated February 27, 1900.

Application filed February 4, 1899. Serial No. 704,483. (No model.)

*To all whom it may concern:*

Be it known that we, FREDERICK J. HEWITT and CHARLES H. BRIDOUX, citizens of the United States, residing at Chicago, in the county of Cook and State of Illinois, have invented certain new and useful Improvements in Machines for Stamping and Sealing Envelops, of which the following is a specification.

This invention relates to that class of machines which are used for the purpose of affixing a postage-stamp to an envelop and sealing the flap and body of the envelop together.

The principal object of our invention is to provide a simple, economical, and efficient machine for the purpose of affixing a postage-stamp to an envelop and sealing the flap and body of the envelop together.

A further object of the invention is to provide a simple, economical, and efficient stamping and sealing machine, with means for feeding a strip of postage-stamps into the machine and cutting them off one by one and affixing them to envelops.

Further objects of the invention will appear from an examination of the drawings and the following description and claims.

The invention consists principally in the combination of means for holding an envelop in position to be operated upon, means for holding a stamp or stamps in position, means for moistening either the stamp or the envelop, and means for affixing a stamp to the envelop.

The invention consists, further, in the combination of means for holding an envelop in position to be operated upon, means for confining and guiding a strip of stamps, means for applying moisture to the envelop, means for feeding a strip of stamps into position in a step-by-step manner, means for cutting a stamp from the strip and affixing it to the envelop, and means for discharging the envelop.

The invention consists, further, in the combination of means for holding an envelop in position to be operated upon, means for applying moisture to the envelop, so as to permit the affixing of the flap to the envelop and sealing the same, means for affixing the flap to the envelop, and means for discharging the sealed envelop.

The invention consists further in an organized machine in which there is combined means for holding an envelop in position to be operated upon, means for confining and guiding a strip of stamps, means for applying moisture to one of such parts, (the stamp or the envelop,) means for cutting a stamp from the strip and affixing it to the envelop, means for moistening the envelop to seal the gummed flap, and means for sealing the gummed flap and body portion together.

The invention consists, further and finally, in the features, combinations, and details of construction hereinafter described and claimed.

Figure 6:
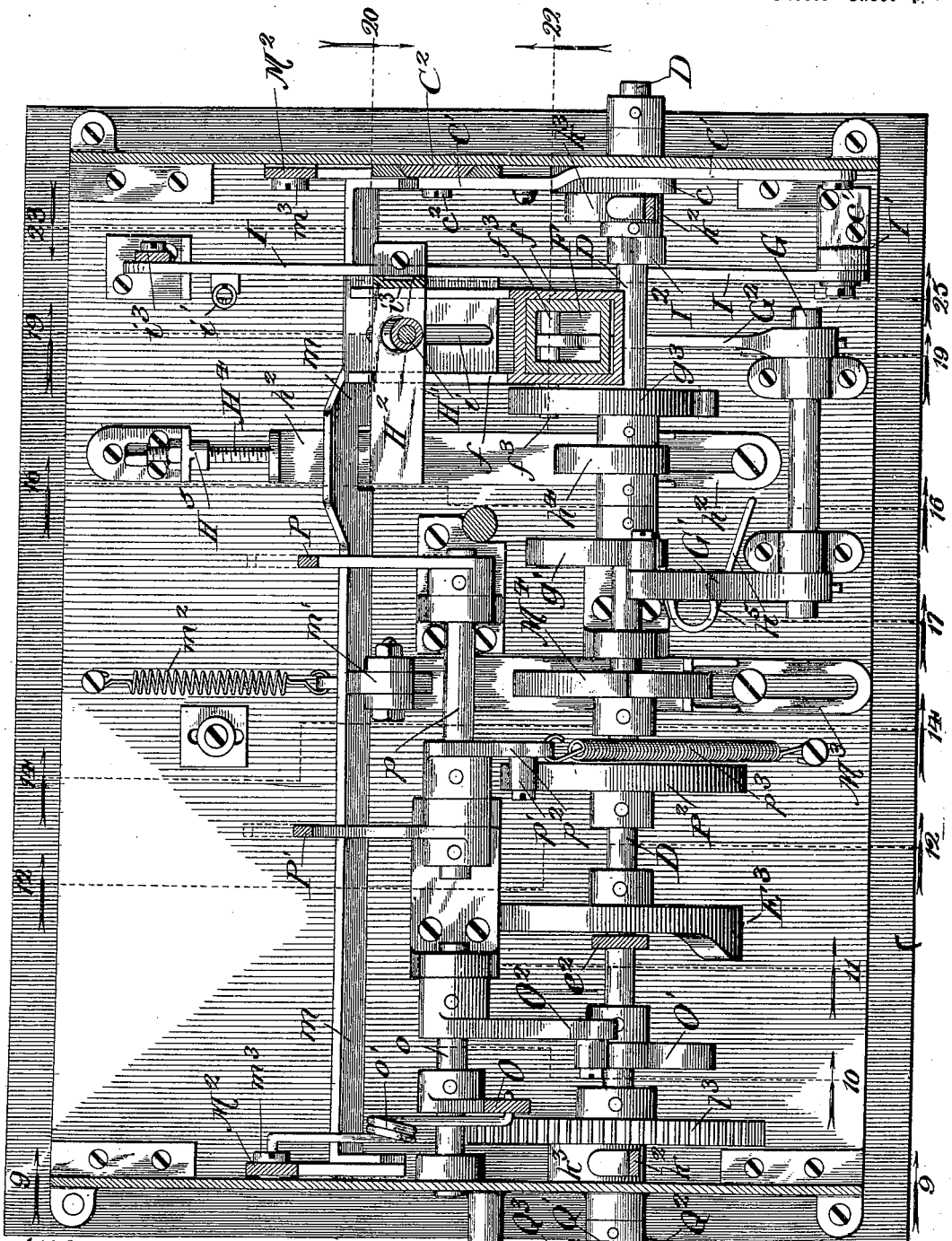

In the accompanying drawings, Figure 1 is an end elevation of one form of machine embodying our improvements; Fig. 2, a detail view of the lower portion of the vertical rack; Fig. 3, a sectional detail taken on the lines 3 of Figs. 4 and 8. Fig. 4 is an enlarged plan view of the machine; Fig. 5, a cross-sectional plan view of the machine, taken on the lines 5 of Figs. 1 and 9; Fig. 6, a plan sectional view of the machine, taken on the lines 6 of Figs. 1 and 9; Fig. 7, a side elevation of the machine looking at it from the right-hand side of Fig. 1 with the supporting-frame left out; Fig. 8, a longitudinal sectional elevation of a portion of the mechanisms, taken on the lines 8 of Figs. 1, 5, 7, and 9; Fig. 9, a cross-sectional elevation taken on the lines 9 of Figs. 4, 6, and 8. Fig. 10 is a sectional detail of a portion of the mechanism, taken on the lines 10 of Figs. 6 and 7; Fig. 11, a similar view taken on the lines 11 of Figs. 6 and 7; Fig. 12, a cross-sectional elevation taken on the lines 12 of Figs. 6 and 7; Fig. 13, a similar view to Fig. 12, showing the mechanism in a different position. Fig. 14 is a sectional diagram taken partly on the lines 14 of Figs. 6 and 7 and partly on the lines 9 of the same figures; Fig. 15, a similar view to that shown in Fig. 14, but illustrating the mechanisms in a different position; Fig. 16, a cross-sectional view taken on the lines 16 of Figs. 6, 7, and 20; Fig. 17, a detail elevation of a portion of the mechanism, taken on the lines 17 of Figs. 6 and 7. Fig. 18 is a plan view of a portion of the stamp-tube shown in elevation directly above the figure; Fig. 19, a cross-sectional elevation taken on the lines 19 of Figs. 6, 7, and 20; Fig. 20, a sectional elevation of a portion of the mechanism, taken on lines 20 of Figs. 6 and 19; Fig. 21, an elevation of a portion of the mechanism, taken on line 21 of Fig. 19; Fig. 22, a sectional elevation of a portion of the mechanism, taken on lines 22 of Figs. 5, 6, 19, and 23; Fig. 23, a sectional elevation of a portion of the mechanism, taken on lines 23 of Figs. 6, 20, and 22; Fig. 24, a sectional detail taken on line 24 of Fig. 23; and Fig. 25, a cross-sectional elevation taken on lines 25 of Figs. 5, 6, and 7.

In the art to which this invention relates it is well known that the process of moistening the gummed flap of an envelop, sealing the same, moistening the postage-stamps, and affixing them to the envelop is a laborious and expensive operation, in that as these processes are carried out by hand it compels mercantile houses to give up a large amount of valuable space to accommodate the great numbers of operators required to perform this work. Further, it is well known that the task is not only a laborious and expensive one, but also a disagreeable one. The principal object of our invention therefore is to provide a simple, economical, and efficient organized machine which will remove these objections and in one machine affix a stamp to the envelop and seal the same, all of which will more fully hereinafter appear.

In constructing a machine in accordance with our improvements we provide a frame A of the desired size, shape, and strength to sustain and hold the operative and other parts in position for use. This frame is supported upon standards A', as shown in Fig. 1 of the drawings, though these standards may be dispensed with and the machine supported upon an ordinary bench or otherwise, as may be desirable or necessary.

In order to hold the envelop in position for stamping and to have its flap moistened, a horizontal table B is provided, which is secured to the frame transversely thereof and arranged in such manner that an envelop X, as shown in Figs. 12 and 15, may be held thereon in position to be operated upon—that is, to be moistened, have a stamp affixed thereto, and have its flap moistened, all of which will be more fully hereinafter set forth. The first step in this method is to provide means for securely holding the envelop, applying moisture thereto, and then affixing a stamp to the moistened part of the envelop. In order to accomplish this result, we provide a vertically-movable platen C, which is adapted to be raised and lowered so as to grasp an envelop between it and the table and hold it in position while the moisture and stamp are being applied to one corner of its face and, as more fully hereinafter described, while the flap is being moistened. In order to give this platen its vertical movements, a driving-cam shaft D is provided, which practically carries all of the cam mechanisms of the machine. On this shaft, and preferably near one end, is mounted what we term the "platen-cam" $c$, arranged to contact a vibrating lever C', which has one end pivoted to the frame at $c'$ and its free end pivotally connected at $c^2$ with a downwardly-extending arm $C^2$ of the platen. A helically-coiled spring $c^3$ is secured to the frame and to the vibrating lever of the platen, so as to normally hold the vibrating lever and the platen in its downward position, while the rotations of the driving-cam shaft and the cam serve to raise the platen to its elevated or free position.

When the platen is held in its down position, so as to grasp an envelop between it and the table, it is desirable and preferable that one corner of the envelop on its face should be moistened so as to receive an ordinary postage-stamp. In order to accomplish this result, what we term a "moistening-lever" E is provided, having at one end a pocket in which a piece of sponge or absorbent material $e$ may be held and which in one position, as shown in Figs. 5 and 22, is arranged to receive a supply of moisture from a tank $e'$ through the medium of the pipe $e^2$. In these figures the moistening-lever, with its absorbent or moisture-holding material, is in position away from the envelop, so that it must be operated to moisten the envelop, and in order to do this a slide-bar E' is provided, which is mounted on the under side of the table and engages with an extending arm on the moistening-lever. This slide-bar in turn is engaged by a bell-crank lever $E^2$, (see Fig. 5,) which has a downwardly-depending arm $e^2$, (see Fig. 9,) arranged to be operated upon by a face-cam $E^3$, which vibrates this bell-crank lever and through it reciprocates the slide-bar, vibrating as well the moistening-lever, so as to bring it into position directly under and in contact with the corner face of an envelop. A helically-coiled spring $e^3$ is provided, which is secured to the frame of the machine and to one end of the moistening-lever and which tends to hold the parts in their inoperative position, while the rotations of the cam $E^3$ on the driving-cam shaft positively actuate the moistening-lever to move it into its operative position.

To affix a postage-stamp to the envelop, a vertically-movable plunger F is provided and arranged in suitable guides $f$, suspended by and depending from the table portion (see Figs. 19 and 22) and at one corner thereof in line with an opening $f'$. (See Fig. 5.) The stamps are fed in in strips through a stamp-tube F', (see Figs. 16 and 18,) and it is necessary to cut them off as well as to affix them to the envelop. In order to accomplish this result, the upper part of the affixing-plunger is provided with a cutter $f^2$, which cuts the stamp at its point of attachment to the next adjacent stamp. In order to give this cutting and affixing plunger its proper vertical movements, a rock-shaft G is provided, which has a lever-arm G' extending out therefrom on one end thereof, so as to be contacted by a cam $g'$, which is arranged on the driving-cam shaft. The other end of the rock-shaft is provided with a lever-arm $G^2$, which has its free end slotted, as at $g^2$, to contact a pin $f^3$ on the cutting and affixing plunger, (see Fig. 19,) so that as the driving-cam shaft rotates the rock-shaft is vibrated and through its lever-arm moves the cutting and affixing plunger at the proper times to cut and press a postage-stamp against the envelop and affix it thereto. To move the cutting and affixing plunger downwardly, a second cutting and affixing cam $g^3$ is provided and mounted upon the driving-cam shaft, (see Fig. 16,) so as to contact the pin $f^3$ and during its rotations move the pin, with its plunger, downwardly.

It is necessary in order to facilitate the process of affixing the stamps to the envelops that the stamps be fed in in strips or sheets. We prefer to feed them in in strips, and it is also desirable to feed these strips in step by step the distance of the length or width of a stamp as a stamp is cut off and affixed to the envelop. We have described the method of cutting off a stamp and affixing it to an envelop and will now proceed to describe the means or mechanism for feeding the stamps into position step by step. In order to do this, the stamp-tube F' above described is slotted in its upper and lower portions to admit pincers or fingers H and H' through such slots to contact the strip of stamps $h$. (Indicated by the heavy dark line in Fig. 19.) These fingers have lateral as well as vertical motions—that is, after they pinch the stamp they must be moved forward so as to move the strip of stamps forward. Then when they are released from contact with the stamp it is necessary to move them backward to their normal positions, and to accomplish this latter result they are mounted in and on a right-angular sliding bar which we will term the "stamp-feed" bar $H^2$ and vertically movably mounted therein. This feeding sliding bar is slidably mounted, as shown at $h^2$, on the base of the machine, so that its backwardly-projecting angular portion $h^3$ may be contacted by a cam $h^4$, (see Fig. 16,) which moves it backward. A spring $h^5$ is arranged to engage therewith and with the base portion, so as to move it in an opposite manner, and thus at the proper times, according to the timing of the cam on the driving-cam shaft, this slide, with the fingers, is moved backward and forward. To move these fingers upward and downward at the proper times and grasp and release the strip of stamps, a lever I is provided and pivotally mounted upon a lug I'. This lever is slotted, as at $i$, (see Fig. 19,) so as to receive the lower finger-bar and contact its pins $h^6$ and $h^7$. This lever is kept at its proper limit of motion by means of the helical spring $i'$ and is moved downward by having a cam $I^2$ on the driving-cam shaft contact a roller $i^2$ on the lever. (See Fig. 19.) It will therefore be seen that this cam and coiled spring, acting on the said lever, move the lower finger upward and downward at the proper time. The upper finger is given its vertical movements in an opposite manner and simultaneously with the lower finger by means of the lever $I^3$, which is connected with the gripping-lever by means of the link $i^3$ (see Fig. 23) and has its free end slotted, as at $i^4$, to engage with a screw $i^5$ on the upper finger-bar and move it up and down in its ways $i^6$. These levers form a compound lever, as it were, and are so arranged that during their movements they move the lower finger up and the upper finger down and the lower finger down and the upper finger up simultaneously and act to grip the stamp strip, while the feeding-slide moves the same forward when the fingers are gripping the same and backward when they have released the strip of stamps.

To limit the backward movements of the slide $H^2$, and thus regulate the length of its movement and compensate for the differences in length or width of stamp, a stop-screw $H^4$ is provided and mounted in a bracket $H^5$, which is secured to the frame of the machine in such a manner that the location or position of this stop-screw limits the feeding movements of the parts and consequently permits the use of different-sized stamps.

We have now described the means for holding the envelop, moistening it to receive the stamp, feeding the strip of stamps forward, and affixing one at a time to an envelop. The next mechanism to be described is the means for holding the flap of the envelop in position to be moistened, to moisten the gummed side of the flap, and finally to close the moistened gummed side of the flap on the envelop and efficiently seal it.

The envelop is first held by the vertically-movable platen hereinbefore described, and in order to hold the flap of the envelop in the desired plane while it is being moistened, assist in positioning the envelop, and prevent it from being passed through the sealing mechanism until the proper time we provide a movable vertical partition or wall K, constituting a retainer for securing the above-named purposes and mount it in slotted ways $k$. (See Fig. 25.) This movable wall or partition is arranged substantially perpendicular to the table and at right angles with a guide $k'$, (see Fig. 5,) all of which assists to locate the position of the envelop. In order to raise and lower this movable partition or wall at the proper times and permit the envelop to be discharged from its gumming position and pass into and between the sealing-rolls L and L', this partition is provided with two downwardly-depending arms $k^2$, (see Fig. 8,) adapted to be contacted by two cams $k^3$ on the driving-cam shaft, so that such cams tend to raise the movable partition, and the weight of the partition itself tends to lower it into the position shown in the drawings. In order to moisten the envelop-flap, we provide what we term a "moisture-holder" M, preferably formed of felt, and secure it to the free edge of a plate M', which is pivotally mounted in two swinging arms $M^2$, the lower ends of which are connected together by means of a cross-bar $m$ and which in turn is pivotally connected to a sliding bar $M^3$ at $m'$. It is necessary to give this swinging plate, with its moistening-brush, a compound forward movement, so that it may contact a sponge in the sponge-holder N and then be turned backward to permit it to be dropped and again moved forward to contact the envelop, as shown in Fig. 15. In order to accomplish this compound movement, a holding lever or arm O is provided, which is pivotally mounted upon a rock-shaft $o$ and is held at it forward limit of motion by means of the spring $o'$. As shown in Fig. 9, the holding lever or arm is in position to hold the swinging plate, with its brush, in its up position and contact the sponge. To move it away from such position and let it drop into the position shown in Fig. 14, a cam O' is provided and adapted to contact a lever $O^2$ on the rock-shaft of the holding-lever and operate the same, so as to throw the holding-lever back into the position shown in Fig. 14. At the same time the cam $M^4$ on the driving-cam shaft, which operates the brush-arms and its slide, has permitted the sliding bar $M^3$ to be turned back to the position shown in Fig. 15 by means of the spring $m^2$, thus moving the lever on its pivot $m^3$ in such a manner that the upper end is pushed forward and the brush contacts the flap of the envelop on the gummed side. The continued movements of the parts move the brush-levers backward at their upper ends and the holding-lever forward at its upper end, thus passing the brush across the flap of the envelop until the parts are again moved to the position shown in Fig. 9. The inclined projection $O^3$ on the holding-lever is for the purpose of forming a rest, as it were, for the lower end of the brush and assist in moving it toward and holding it in contact with the gummed flap of the envelop as well as a stop to limit the forward motion of the lever.

When the gummed envelop has been moistened, it is necessary to raise the movable wall or partition and force the moistened and stamped envelop into and between the sealing-rolls, so that such rolls may compress the flap and body of the envelop together and firmly affix and seal them in such engagement. In order to do this, we provide a pair of discharging arms or levers P and P', which are mounted upon a rock-shaft $p$. These levers are held in their normal back position by means of a heart-shaped cam $P^2$, which contacts a roll $p'$ on an arm $p^2$, which is engaged with the rock-shaft upon which the discharging-arms are mounted. During the rotation of this cam, which is mounted upon the driving-cam shaft, the roll $p'$ comes opposite the depression in the cam and the coiled spring $p^3$ is permitted to rock the rock-shaft and bring the discharging levers or arms into contact with the envelop and at the same time the movable partition is raised and forces the envelop into engagement with the sealing-rolls, which seal and discharge the stamped and sealed envelop to the outside. The sealing-rolls are provided with spur-gears $l$ and $l'$, engaging with each other, while the gears $l^2$ and $l^3$ transmit power and motion from the driving-shaft to such rolls.

To operate the parts, the driving-cam shaft is provided with a spur-gear Q, arranged to be engaged with a vertically-movable rack R. This rack is held at its upper limit of motion by means of the helically-coiled springs $r$ and $r'$, which are engaged with the frame and with the connecting-rod R', extending down from the vertically-movable rack. The lower end of the rack is connected with a treadle S, so that the downward and upward movements of the rack are used to rotate the driving-gear. The driving-gear is loosely mounted on the driving-cam shaft and provided with a pawl Q', which is held in engagement with a ratchet $Q^2$ by means of the spring $Q^3$. It will thus be seen that the downward movements of the rack impart a rotary motion to the driving-cam shaft, while during the upward movement of the rack and the backward rotation of the gear the pawl is permitted to slip over the ratchet. Of course it will be understood that this means of operating the mechanisms can be dispensed with and the rotating-cam shaft driven in any suitable manner.

In operation an envelop is placed on the table of the machine so that its flap is open, as shown in one of the figures. The mechanism is then started and the platen forced down, so as to squeeze or grip the envelop between it and the table. The strip of stamps is next fed forward into position, the envelop moistened, and the stamp cut off from the strip and affixed to the moistened envelop. The continued operations of the machine cause the swinging moistening-plate to be dropped and pushed forward. The supplemental lever is then operated so that its free end contacts the swinging plate and forces it against the gummed flap of the envelop, while the lever-arms, which carry the swinging moistening-plate, are moved backwardly at their upper ends, causing such plate to "wipe" the gummed envelop. As soon as the gummed envelop-flap has been moistened the cam mechanisms are so timed that the vertical partition is raised a short distance—in the neighborhood of a quarter of an inch—and the discharging lever-arms vibrated so as to throw the envelop from its gumming or moistening position into engagement with the cylindrical sealing-rolls, which affix and completely seal the gummed flap to the body of the envelop and at the same time discharge the envelop from the machine.

We claim—

1. In a machine of the class described, the combination of a table adapted to receive an envelop to be held in position thereon, a vertically-movable clamp between which and the table the body of the envelop is clamped and held in position, means for giving a vertical movement to the clamp, means for holding a stamp in position for affixing to the envelop, means for moistening one of such pieces, and means for affixing a stamp to the envelop, substantially as described.

2. In a machine of the class described, the combination of a table adapted to receive an envelop to be held in position thereon, a vertically-movable clamp between which and the table the body of the envelop is clamped and held in position, means for giving a vertical movement to the clamp, means for holding a strip of stamps in position for affixing a stamp to an envelop, means for applying moisture to one of such pieces, means for cutting a stamp from the strip and affixing it to an envelop, and means for feeding the strip of stamps into position step by step, substantially as described.

3. In a machine of the class described, the combination of a table adapted to receive and hold an envelop in a horizontal position thereon, a vertically-movable clamp between which and the table the body of the envelop is clamped and held, means for giving a vertical movement to the clamp, means for holding a strip of stamps in position for affixing a stamp to an envelop, means for applying moisture to one of such pieces, means for cutting a stamp from the strip and affixing it to an envelop, and means for feeding the stamps into position in a step-by-step manner, substantially as described.

4. In a machine of the class described, the combination of a table adapted to receive an envelop to be held in a horizontal position thereon, a movable clamp between which and the table the body of the envelop is clamped and held in position to receive a stamp, means for holding a strip of stamps in position for affixing a stamp to an envelop, means for applying moisture to one of such pieces, means for cutting a stamp from the strip and affixing it to the envelop, means for feeding the stamps into position in a step-by-step manner, and means for discharging the stamped envelop after the stamp has been affixed thereon, substantially as described.

5. In a machine of the class described, the combination of a table for holding an envelop in position, a movable partition to assist in holding the envelop in position, a movable platen or similar element for squeezing the envelop between it and the table, a vibrating lever adapted to carry moisture-holding material and apply moisture to the surface of the envelop, means for operating the same, means for confining and guiding a strip of stamps, means for feeding the strip of stamps into position in a step-by-step manner, means for cutting off a stamp from the strip and affixing it to the envelop, means for operating the movable partition, and means for discharging the stamped envelop from its stamping position, substantially as described.

6. In a machine of the class described, the combination of a horizontal table for holding an envelop in position to be operated upon, a vertically-movable partition or wall to assist in holding the envelop in position, means for operating the same at the proper time, a vertically-movable platen for grasping the envelop between it and the horizontal table, means for operating the same at the proper time, a lever adapted to vibrate in a horizontal plane and carry moisture-holding material at one portion thereof and arranged to moisten a portion of the surface of the envelop, means for holding a strip of stamps, means for feeding the strip of stamps into position in a step-by-step manner, means for cutting off a stamp from the strip and affixing it to the envelop, and means for discharging the envelop from the table, substantially as described.

7. In a machine of the class described, the combination of a horizontal table for holding an envelop in position to be operated upon, a vertically-movable partition or wall to assist in holding the envelop in position, cam mechanism for operating the partition at the proper time, a vertically-movable platen for gripping the envelop between it and the table, cam mechanism for operating the same at the proper time, a swinging lever arranged to vibrate in a horizontal plane and carry a piece of moisture-holding material in contact with the surface of the envelop and moisten the same, cam mechanism for operating the swinging lever at the proper time, means for holding a strip of stamps, means for feeding the strip of stamps into position in a step-by-step manner, means for cutting off a stamp from the strip and affixing it to the envelop, and means for discharging the envelop from the table, substantially as described.

8. In a machine of the class described, the combination of a table adapted to receive an envelop to be held in horizontal position thereon, a movable clamp between which and the table the body of the envelop is clamped and held in position to receive a stamp, means for holding a strip of stamps and feeding it into position step by step for affixing a stamp to an envelop, means for applying moisture to one of such pieces, a vertically-movable plunger provided with a cutting edge for severing a stamp from the strip and affixing it to the envelop, cam mechanism for operating the stamp cutting and affixing plunger at the proper time, and means for discharging the envelop from the table after the stamp is affixed thereto, substantially as described.

9. In a machine of the class described, the combination of a horizontal table for holding an envelop in position, a vertically-movable partition or wall to assist in holding the same in position and prevent its discharge, cam mechanism for moving the vertically-movable wall at the proper time to permit the discharge of the envelop, means for applying moisture to and affixing a stamp to the envelop, a lever-arm for discharging the envelop from the table at the proper time, and cam mechanism for operating the lever-arm, substantially as described.

10. In an apparatus of the class described, the combination of a horizontal table for holding an envelop in position to be operated on, a vertically-movable wall to assist in holding the envelop in position and prevent its discharge, cam mechanism for operating the vertically-movable wall at the proper time to permit the discharge of an envelop, a vertically-movable platen adapted to grip the envelop between it and the table, cam mechanism for operating the same, a swinging lever arranged to vibrate in a horizontal plane and carry a piece of moisture-holding material into contact with the surface of the envelop, cam mechanism for operating the moistening-lever in one direction, spring mechanism for vibrating it in the opposite direction, a tube for confining and guiding a strip of stamps, means for feeding the strip of stamps into position in a step-by-step manner, means for cutting off a stamp from the strip and affixing it to an envelop, and means for discharging the envelop from the table, substantially as described.

11. In an apparatus of the class described, the combination of a horizontal table for holding an envelop in position to be operated on, a vertically-movable wall to assist in holding the envelop in position and prevent its discharge, cam mechanism for operating the vertically-movable wall at the proper time to permit the discharge of an envelop, a vertically-movable platen adapted to grip the envelop between it and the table, cam mechanism for operating the same, a swinging lever arranged to vibrate in a horizontal plane and carry a piece of moisture-holding material into contact with the surface of the envelop, cam mechanism for operating the moistening-lever in one direction, spring mechanism for vibrating it in the opposite direction, a tube for confining and guiding a strip of stamps, means for feeding the strip of stamps into position in a step-by-step manner, a vertically-movable plunger provided with a cutting edge for cutting off a stamp from the strip and affixing it to the envelop, cam-and-lever mechanism for operating the plunger at the proper time or times, and means for discharging the envelop, substantially as described.

12. In an apparatus of the class described, the combination of a horizontal table for holding an envelop in position to be operated on, a vertically-movable wall to assist in holding the envelop in position and prevent its discharge, cam mechanism for operating the vertically-movable wall at the proper time to permit the discharge of an envelop, a vertically-movable platen adapted to grip the envelop between it and the table, cam mechanism for operating the same, a swinging lever arranged to vibrate in a horizontal plane and carry a piece of moisture-holding material into contact with the surface of the envelop, cam mechanism for operating the moistening-lever in one direction, spring mechanism for vibrating it in the opposite direction, a tube for holding a strip of stamps in position, means for feeding the strip of stamps into position in a step-by-step manner, a vertically-movable plunger provided with a cutting edge for cutting off a stamp from the strip and affixing it to the envelop, cam-and-lever mechanism for operating the plunger at the proper time or times, a swinging lever-arm arranged to contact the envelop and discharge the same from the table, and cam mechanism for operating the discharging swinging lever-arm at the proper time or times, substantially as described.

13. In a machine of the class described, the combination of a horizontal table for holding an envelop in position to be operated on, a vertically-movable partition arranged to assist in holding the envelop in position and prevent its discharge, depending arm mechanism attached to said partition, cam mechanism adapted to contact the depending arm mechanism of the movable partition and operate the same at the desired time, a vertically-movable platen adapted to grasp an envelop between it and the table and provided with a depending arm, cam mechanism for operating this movable platen at the desired times, a tube for confining and guiding a strip of stamps, means for feeding a strip of stamps into position in a step-by-step manner, means for applying moisture to the envelop, a vertically-movable plunger for cutting and affixing a stamp to the envelop, cam-and-lever mechanism for operating the vertically-movable plunger, and means for discharging the envelop from the table at the proper time, substantially as described.

14. In a machine of the class described, the combination of a horizontal table for holding an envelop in position, a vertically-movable partition to assist in holding an envelop in position and prevent its discharge, means for operating the vertically-movable partition at the proper time, a vertically-movable platen for gripping an envelop between it and the table, means for applying moisture to the envelop, a slotted tube for confining and guiding a strip of stamps, finger mechanism for gripping the stamps, means for operating the finger mechanism to grip the stamps and move them forwardly in a step-by-step manner, a vertically-movable plunger provided with a cutter for cutting a stamp from the strip and affixing it to the envelop, and means for discharging the envelop, substantially as described.

15. In a machine of the class described, the combination of a horizontal table for holding an envelop in position, a vertically-movable partition to assist in holding an envelop in position and prevent its discharge, means for operating the vertically-movable partition at the proper time, a vertically-movable platen for gripping an envelop between it and the table, means for applying moisture to the envelop, a slotted tube for confining and guiding a strip of stamps, finger mechanism arranged above and below the slotted tube and adapted to be moved vertically and forwardly and backwardly to grasp the strip of stamps during its forward movement and release them during their backward movement, means for operating the finger mechanism vertically and backwardly and forwardly, a vertically-movable plunger provided with a cutting edge for cutting a stamp from the strip and affixing it to the envelop, and means for discharging the envelop from the table, substantially as described.

16. In a machine of the class described, the combination of a horizontal table to hold an envelop in position, a vertically-movable partition to assist in holding the envelop in position and prevent its discharge, depending arm mechanism on such movable partition, cam mechanism to operate the depending arm mechanism and the movable partition at the proper time and permit the discharge of the envelop, a vertically-movable platen for gripping the envelop between it and the table provided with a depending arm, a lever pivotally connected with the depending arm of the platen, cam-and-spring mechanism for operating the depending arm and platen at the proper times, a vibrating lever arranged to swing in a horizontal plane and adapted to carry moistening material to moisten the envelop, cam-and-lever mechanism for operating this moistening-lever at the proper times, a tube arranged in a horizontal plane or substantially so and provided with slots in its upper and lower portions for confining and guiding a strip of stamps, finger mechanism vertically movably mounted in a slide adapted to pass through the slots in the tube for gripping the stamps and moving them forward, means for moving the finger-slide back and forward at the proper times, means for operating the finger mechanism vertically to grip the stamp and release it at the proper times, a vertically-movable plunger for cutting off a stamp from the strip and affixing it to the envelop, and means for discharging the envelop from the table at the proper time, substantially as described.

17. In a machine of the class described, the combination of a frame portion, a horizontal table for holding an envelop in position to be operated upon, a partition or wall vertically movably mounted in ways in the frame portion to assist in positioning the envelop and prevent its discharge, depending arm mechanism on this movable partition, cam mechanism to move the partition at the proper time to permit the discharge of an envelop, a vertically-movable platen provided with a depending arm mounted in a vertical guide on the frame of the machine for grasping the envelop between it and the table, a lever pivoted to the depending arm of the platen and the frame of the machine, cam-and-spring mechanism for operating this platen-lever and the platen at the proper time, a vibrating lever arranged to swing in a horizontal plane and carry a piece of moistening material into contact with the lower surface of the envelop, a sliding bar arranged to contact and operate the moistening-lever, a swinging lever arranged to operate this sliding bar, a cam-and-spring mechanism arranged to operate these swinging levers and sliding bars and carry the moistening material into contact with the envelop at the proper times, a slotted tube arranged in a horizontal plane or substantially so for confining and guiding a strip of stamps, a slide to move backward and forward and provided with two fingers vertically movably mounted therein and arranged to pass through the slots in the stamp-tube and grip a stamp during the forward movement of the same and release it during the backward movement of the same, cam mechanism for moving the slide backward and forward, cam-and-lever mechanism for operating the fingers vertically to grip the stamp and release it at the proper times, a vertically movably mounted plunger for cutting off a stamp from the strip and affixing it to the envelop, cam-and-lever mechanism for operating the plunger at the desired times, and means for discharging the envelop from the table at the proper time, substantially as described.

18. In a machine of the class described, the combination of a frame, a horizontal table for holding an envelop in position to be operated upon, a movable partition or wall mounted in vertical guides in the frame of the machine, a depending arm arranged at or near each end of the movable partition, a rotating cam-shaft, a cam on the rotating cam-shaft for each of the depending arms to operate the same and move the partition at the proper times to permit the discharge of an envelop, a movable platen adapted to grasp an envelop between it and the table and provided with a depending arm mounted in vertical guides on the frame of the machine, a lever pivoted to the frame of the machine and the depending arm of the platen, a spring connected with the lever and with the frame of the machine to move the platen downwardly, and a cam on the rotating cam-shaft adapted to move the platen upwardly against the tension of the spring, a swinging lever arranged to vibrate in a horizontal plane and carry moistening material into contact with the lower surface of the envelop, a spring to move this lever in one direction, a sliding bar and vibrating lever and a cam to operate the moistening-lever in the opposite direction, a stamp-tube arranged in a horizontal plane or substantially so and provided with slots in its upper and lower walls for confining and guiding a strip of stamps, a vertically-movable plunger for cutting off a stamp from the strip and affixing it to the envelop, a rock-shaft provided with a lever-arm engaging with the vertically-movable plunger and with a second lever-arm to be operated by a cam and a cam for moving the cutting and affixing plunger upwardly, a cam for moving the plunger downwardly, lever mechanism for discharging an envelop, and cam mechanism for operating the discharging-levers at the proper time, substantially as described.

19. In a machine of the class described, the combination of a frame, a horizontal table for holding an envelop in position to be operated upon, a movable partition or wall mounted in vertical guides in the frame of the machine, a depending arm arranged at or near each end of the movable partition, a rotating cam-shaft, a cam on the rotating cam-shaft for each of the depending arms to operate the same and move the partition at the proper times to permit the discharge of an envelop, a movable platen adapted to grasp an envelop between it and the table and provided with a depending arm mounted in vertical guides on the frame of the machine, a lever pivoted to the frame of the machine and the depending arm of the platen, a spring connected with the lever and with the frame of the machine to move the platen downwardly and a cam on the rotating cam-shaft adapted to move the platen upwardly against the tension of the spring, a swinging lever arranged to vibrate in a horizontal plane and carry moistening material into contact with the lower surface of the envelop, a spring to move this lever in one direction, a sliding bar and vibrating lever and a cam to operate the moistening-lever in the opposite direction, a stamp-tube provided with slots in its upper and lower walls for confining and guiding a strip of stamps, a vertically-movable plunger for cutting off a stamp from the strip and affixing it to the envelop, a rock-shaft provided with a lever-arm engaging with the vertically-movable plunger and with a second lever-arm to be operated by a cam and a cam for moving the cutting and affixing plunger upwardly, a cam for moving the plunger downwardly, a rock-shaft provided with a discharging-lever, arm or arms projecting through the supporting-table to contact the envelop and discharge it at the proper times, a lever-arm on such rock-shaft, a cam on the rotating cam-shaft for operating the lever-arm in one direction, and a spring for operating it in the other direction, whereby the discharging-lever arm is operated at the proper time or times, substantially as described.

20. In a machine of the class described, the combination of a table for holding and supporting an envelop in position to be operated upon, a vertical partition to assist in positioning the envelop and form a support for the flap thereof, means for applying moisture to the flap of the envelop, means for raising the vertical partition at the proper times to permit the discharge of the envelop, means for sealing or affixing the free end of the flap to the envelop, and means for discharging the envelop, substantially as described.

21. In a machine of the class described, the combination of a table adapted to receive an envelop to be held in horizontal position thereon, means for clamping and holding the body of the envelop on the table, a movable retainer coacting with the table for positioning the envelop and holding the flap thereof opened, means for applying moisture to the flap, means for affixing the free end of the flap to the envelop, and means for discharging the envelop after it is sealed, substantially as described.

22. In a machine of the class described, the combination of a table adapted to receive an envelop and have the body of the envelop held in a horizontal position thereon, a movable retainer adapted for positioning the envelop on the table and holding the flap thereof opened, means for applying moisture to the envelop for sealing the flap thereto, means for affixing the free end of the flap to the envelop, and means for discharging the envelop after it is sealed, substantially as described.

23. In a machine of the class described, the combination of a frame portion, a horizontal table for holding an envelop in position to be operated upon, a vertical partition movably mounted in vertical ways on the frame of the machine to assist in holding the envelop in position and furnish a support for the flap of the envelop, means for operating the vertical partition at the proper time or times to permit the discharge of the envelop, means for applying moisture to the envelop to provide for the affixing of the envelop and flap together, means for discharging the envelop from its gumming position, and a pair of rolls adapted to receive the discharged envelop and affix the free end of the flap and envelop together and discharge it in a sealed condition, substantially as described.

24. In a machine of the class described, the combination of a frame portion, a horizontal table for holding an envelop in position to be operated upon, a vertical partition or wall movably mounted in vertical ways or guides in the frame of the machine to assist in positioning the envelop and furnish a support for the flap thereof, cam mechanism for operating this vertically-movable partition at the proper time to permit the discharge of the envelop, a swinging plate provided with a piece of moisture-holding material adapted to be passed over the gum-flap and apply moisture thereto, lever mechanism on which this swinging plate is mounted to move the swinging plate into position with the gummed envelop, cam mechanism for operating this lever mechanism at the proper time or times, lever mechanism for discharging the envelop from its gumming position at the proper times, and a pair of cylindrical rolls adapted to receive the moistened envelop as it is discharged from its gumming position and seal the same, substantially as described.

25. In a machine of the class described, the combination of a frame portion, a horizontal table for holding an envelop in position to be operated upon, a vertical partition or wall to assist in positioning the envelop and prevent its discharge and form a support for the flap, cam mechanism for operating the vertical partition at the proper time or times to permit the discharge of the envelop, a swinging plate adapted to carry moistening material at its free end and contact the gummed surface of the envelop-flap and apply moisture thereto, a pair of lever-arms pivotally mounted to the frame of the machine to which the moistening-plate is pivotally secured, spring mechanism for operating these lever-arms in one direction, cam mechanism for operating the lever-arms in the other direction, a discharge lever or levers to contact the envelop at a proper time and discharge the same from its gumming position, and means for affixing the gummed edge of the flap to the body of the envelop, substantially as described.

26. In a machine of the class described, the combination of a frame portion, a horizontal table to hold an envelop in position to be operated upon, a vertical partition or wall movably mounted in vertical guides on the frame portion, depending arm mechanism on the movable partition, a cam-shaft, a cam on the cam-shaft for contacting the depending arm on the movable partition and operating the same at desired times, a swinging moistening-plate provided with moistening material at its free edge adapted to contact the gummed envelop-flap and moisten the same, a swinging lever-arm pivotally secured to the end of the moistening-plate and to the frame of the machine, a sliding bar mounted in the frame of the machine adapted to reciprocate thereon and pivotally connect with the arm of the moistening-plate, a cam on the cam-shaft for moving the sliding bar in one direction, spring mechanism for moving the sliding bar and swinging arms of the moistening-plate in the opposite direction, mechanism for discharging the envelop from its gummed position, and a pair of cylindrical rolls adapted to receive the discharging envelop and seal the flap and body of the envelop together, substantially as described.

27. In a machine of the class described, the combination of a frame portion, a horizontal table adapted to hold an envelop in position to be operated upon, a vertical partition movably mounted in the vertical guides in the frame portion to assist in holding the envelop in position to be operated upon, depending arm mechanism on the vertical partition, a cam-shaft, a cam on the cam-shaft adapted to contact the depending arm mechanism and operate the partition at the desired times, a swinging plate provided with moisture-holding material at the free edge thereof, a swinging lever-arm pivotally connected to the frame portion for each end of the swinging moistening-plate to which it is pivotally connected, a connecting-bar connecting the lower ends of these swinging arms together, a sliding bar mounted in ways in the frame of the machine and pivotally connected to the cross or connecting bar of the moistening-plate arms, a cam on the cam-shaft adapted to move this sliding bar in one direction, a spring secured to the frame of the machine and to the swinging lever mechanism to move the same in the opposite direction, a supplementary lever pivotally mounted in the frame of the machine and adapted at its free swinging end to operate on the swinging plate, cam and spring mechanism to operate this supplemental lever and assist in the operations of the moistening-plate, lever mechanism for discharging the envelop from its gumming position, and a pair of cylindrical rolls adapted to receive the moistened gummed envelop and seal the same, substantially as described.

28. In a machine of the class described, the combination of a frame portion, a horizontal table adapted to hold an envelop in position for use, a vertical partition movably mounted in vertical ways or guides in the frame of the machine, depending arm mechanism on the vertical partition, a cam-shaft, a cam on the cam-shaft to operate the depending arm mechanism and move the partition at desired times and permit the discharge of the envelop, a swinging plate provided with moisture-holding material at its free edge adapted to be moved into position to apply moisture to the gummed surface of the envelop, a pivoted lever-arm for each end of the swinging moistening-plate pivotally secured to the frame of the machine, a cross-bar connecting such lever-arms together, a sliding bar to which the cross-bar is connected, a spring secured to such parts for moving them in one direction, a cam on the cam-shaft adapted to contact the sliding bar and move the parts in an opposite direction, a supplemental lever pivotally secured to the frame of the machine and so arranged that its free end contacts the swinging moistening-plate to assist it in its operations, a rock-shaft upon which the supplemental lever is mounted, an arm on such rock-shaft, a cam on the cam-shaft adapted to contact this last-named arm and operate the lever in one direction, a spring connected with the supplemental arm to move it in the opposite direction, discharging-lever mechanism to discharge the envelop from its gumming position, and cylindrical rolls adapted to grasp the moistened gummed envelop and seal the same, substantially as described.

29. In an organized machine for stamping and sealing envelops, the combination of a table adapted to receive an envelop to be held in a horizontal position thereon, a movable clamp between which and the table the body of the envelop is clamped and held, a movable retainer adapted for positioning the envelop on the table and holding the flap thereof opened, means for confining and guiding a strip of stamps for a stamp to be affixed to an envelop, means for applying moisture to one of such pieces, means for cutting a stamp from the strip and affixing the same to an envelop, means for moistening the gummed flap, means for discharging the envelop from its gumming position, and means for affixing the flap to the body of the envelop and sealing the same, substantially as described.

30. In an organized machine for stamping and sealing envelops, the combination of a table adapted to receive an envelop to be held in a horizontal position thereon, a movable clamp between which and the table the body of the envelop is clamped and held, a movable retainer adapted for positioning the envelop on the table and holding the flap thereof opened, means for confining and guiding stamps into position for affixing a stamp to an envelop, means for applying moisture to one of such pieces, means for affixing the stamp to the envelop, means for applying moisture to the envelop for the purpose of affixing the gummed flap thereto, means for discharging the envelop from its gumming and stamping position, and means for sealing the flap and envelop together, substantially as described.

31. In an organized machine for stamping and sealing envelops, the combination of a frame portion, a rotating cam-shaft thereon, a table for holding an envelop in position to be operated on, a vertical partition movably mounted in guides in the frame of the machine to assist in holding the envelop in position and form a support for the flap and prevent the discharge of the envelop from the stamping position at desired times, cam mechanism on the cam-shaft to operate this movable partition at the desired time, means for confining and guiding a strip of stamps, means for applying moisture to the envelop, means for feeding the strip of stamps forwardly in a step-by-step manner, means for cutting off a stamp from the strip and affixing it to the envelop, means for applying moisture to the gummed surface of the envelop-flap, means for discharging the envelop from its stamping and gumming position, and a pair of cylindrical rolls adapted to receive the envelop as it is discharged and seal the flap and body portion together, substantially as described.

32. In an organized machine for stamping and sealing envelops, the combination of a frame portion, a table for holding an envelop in position to be operated on, a vertical partition or wall movably mounted in the vertical ways or guides on the frame of the machine to assist in holding the envelop in position and provide a support for the envelop-flap, means for operating the movable partition at desired times to permit the discharge of the envelop, a platen movably mounted in ways in the frame of the machine for holding the envelop between it and the table portion while a stamp is being affixed thereto and while the envelop-flap is being moistened, means for operating the platen at the desired time, a stamp-tube for confining and guiding a strip of stamps, means for feeding the strip of stamps into the desired position, means for feeding the strip of stamps into position in a step-by-step manner, a vertically-movable plunger for cutting off a stamp from the strip and affixing it to the envelop, means for operating this cutting and affixing plunger at the proper times, a swinging plate provided with moisture-holding material at its free lateral edge to apply moisture to the gummed surface of the envelop-flap, means for operating the swinging plate at the desired times, means for discharging the envelop from its stamping and gumming position, and a pair of cylindrical rolls adapted to receive the envelop as it is discharged and seal the flap and body portion together, substantially as described.

FREDERICK J. HEWITT.
CHARLES H. BRIDOUX.

Witnesses:
THOMAS P. SHERIDAN,
THOMAS B. McGREGOR.